(12) United States Patent
Wang (10) Patent No.: US 10,177,970 B2
(45) Date of Patent: Jan. 8, 2019

(54) METHOD AND APPARATUS FOR CONTROLLING DATABASE CONNECTION (71) Applicant: BEIJING BAIDU NETCOM SCIENCE AND TECHNOLOGY CO., LTD., Haidian District Beijing (CN)

(72) Inventor: Tianyu Wang, Haidian District Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 125 days.

(21) Appl. No.: 15/281,234

(22) Filed: Sep. 30, 2016

(65) Prior Publication Data
US 2017/0331674 A1 Nov. 16, 2017

(30) Foreign Application Priority Data
May 11, 2016 (CN) .......................... 2016 1 0312417

(51) Int. Cl.
G06F 9/50 (2006.01)
G06F 21/00 (2013.01)
H04L 12/24 (2006.01)
H04L 12/26 (2006.01)
H04L 29/08 (2006.01)
H04W 40/00 (2009.01)
(Continued)

(52) U.S. Cl.
CPC .......... H04L 41/069 (2013.01); G06F 9/5033 (2013.01); G06F 9/5083 (2013.01); G06F 21/00 (2013.01); H04L 41/0654 (2013.01); H04L 43/12 (2013.01); H04L 67/1002 (2013.01); H04L 47/525 (2013.01); H04L 47/70 (2013.01); H04W 40/00 (2013.01)

(58) Field of Classification Search
CPC ... H04L 41/0654; H04L 41/069; H04L 43/12; H04L 47/525; H04L 47/70; H04L 67/1002; H04W 40/00; G06F 21/00; G06F 9/5083; G06F 9/5033
See application file for complete search history.

(56) References Cited

U.S. PATENT DOCUMENTS 7,337,226 B2 * 2/2008 Saha ................. G06F 17/30457
709/223
8,484,242 B1 * 7/2013 Singh ................ G06F 17/30442
707/770

(Continued)

Primary Examiner — Asad M Nawaz
Assistant Examiner — Kai Chang
(74) Attorney, Agent, or Firm — Miller, Matthias & Hull LLP (57) ABSTRACT The present application discloses a method and apparatus for controlling a database connection. A specific embodiment of the method comprises: receiving an access request for a database sent by a terminal; determining whether a database connection pool comprises an idle database connection for the database; reusing the idle database connection to connect the terminal with the database if the database connection pool comprises the idle database connection for the database; and establishing a new database connection, in order to connect the terminal with the database by utilizing the new database connection if the database connection pool comprises no idle database connections. This embodiment effectively utilizes fewer database connections to support database access requests.

17 Claims, 6 Drawing Sheets (51) Int. Cl.
*H04L 12/877* (2013.01)
*H04L 12/911* (2013.01)

(56) References Cited

U.S. PATENT DOCUMENTS

| | | | | |
|---|---|---|---|---|
| 8,645,556 | B1* | 2/2014 | Masters | H04L 67/1008 703/21 |
| 9,369,530 | B2* | 6/2016 | Shankar | H04L 67/141 |
| 2004/0006625 | A1* | 1/2004 | Saha | G06F 17/30457 709/227 |
| 2004/0221031 | A1* | 11/2004 | Desai | H04L 67/42 709/224 |
| 2006/0200533 | A1* | 9/2006 | Holenstein | G06F 17/30578 709/208 |
| 2009/0064199 | A1* | 3/2009 | Bidelis | G06F 9/5027 719/328 |
| 2013/0144984 | A1* | 6/2013 | Zhao | H04L 65/608 709/219 |
| 2014/0324911 | A1* | 10/2014 | de Lavarene | G06F 17/30289 707/781 |
| 2016/0014038 | A1* | 1/2016 | Thyagarajan | H04L 47/70 709/226 |

* cited by examiner

METHOD AND APPARATUS FOR CONTROLLING DATABASE CONNECTION

CROSS-REFERENCE TO RELATED APPLICATION

This application is related to and claims priority from Chinese application No. 201610312417.0, filed on May 11, 2016, entitled "Method And Apparatus For Controlling Database Connection," the entire disclosure of which is hereby incorporated by reference.

TECHNICAL FIELD

The present application relates to the field of computer technology, particularly to the field of database application development, and specifically to a method and apparatus for controlling a database connection.

BACKGROUND

With the explosive growth of Internet data, database, as a storage medium of the internet data, carries increasing amounts of data and accesses to the data from terminals. A database connection is an interaction channel between a terminal and a database. In the existing method for controlling a database connection, the database connection is usually bundled with a working thread of a server. Therefore, it is quite costly for the database to maintain the bundled database connection, leading to a reduction in the throughput of the database.

Therefore, how to effectively and stably support a large amount of database access requests with fewer database connections becomes a technical problem to be solved.

SUMMARY

An objective of the present application is to provide a method and apparatus for controlling a database connection to solve the technical problem mentioned in the BACKGROUND.

In the first aspect, the present application provides a method for controlling a database connection. The method comprises: receiving an access request for a database sent by a terminal; determining whether a database connection pool comprises an idle database connection for the database; reusing the idle database connection to connect the terminal with the database if the database connection pool comprises the idle database connection for the database; and establishing a new database connection, in order to connect the terminal with the database by utilizing the new database connection if the database connection pool comprises no idle database connections.

In some embodiments, the reusing the idle database connection to connect the terminal with the database if the database connection pool comprises the idle database connection for the database comprises: comparing a connection attribute between the terminal and the reused database connection with a connection attribute between the reused database connection and the database, to determine a difference thereof; and sending to the database an attribute modification request including the difference, the attribute modification request being used by the database to modify the connection attribute between the reused database connection and the database.

In some embodiments, the establishing the new database connection, in order to connect the terminal with the database by utilizing the new database connection if the database connection pool comprises no idle database connections comprises: sending a connection establishment request to the database; adding a database connection within a connection establishing process into a preset array; searching, from the preset array, a database connection corresponding to a response message returned by the database upon receiving the response message; in order to connect the terminal with the database by utilizing the database connection corresponding to the response message.

In some embodiments, the method further comprises: controlling the number of the database connection for the database according to a preset control rule of the database connection.

In some embodiments, the controlling the number of the database connection for the database according to the preset control rule of the database connection comprises: reusing the idle database connection and releasing a time-out database connection when the number of the received access requests is less than or equal to a first preset value; reusing the idle database connection and releasing the idle database connection when the number of the received access requests is greater than the first preset value and less than or equal to a second preset value and the number of non-idle database connections for the database is greater than a preset maximum connection number of the database connection pool; and establishing the new database connection, reusing the idle database connection, and releasing the idle database connection when the number of the received access requests is greater than the second preset value.

In some embodiments, the establishing the new database connection, in order to connect the terminal with the database by utilizing the new database connection if the database connection pool comprises no idle database connections comprises: selecting one of slave databases of the database as a target database if the database connection pool comprises no idle database connections; and establishing a new database connection connected to the target database.

In some embodiments, the selecting one of the slave databases of the database as the target database comprises: determining a ratio of the number of non-idle database connections of a slave database to a weight of the slave database for each of the slave databases; and selecting a slave database with a minimum ratio as the target database.

In some embodiments, the selecting one of the slave databases of the database as the target database comprises: selecting one of the slave databases of the database as the target database by using a random algorithm.

In some embodiments, the method further comprises: detecting whether a fault occurs in each of the slave databases; shielding a faulted slave database; probing the faulted slave database at a preset interval; and de-shielding a slave database when the fault is removed.

In the second aspect, the present application provides an apparatus for controlling a database connection. The apparatus comprises: a receiving unit for receiving an access request for a database sent by a terminal; a determination unit for determining whether a database connection pool comprises an idle database connection for the database; a reuse unit for reusing the idle database connection to connect the terminal with the database if the database connection pool comprises the idle database connection for the database; and a connection-establishing unit for establishing a new database connection, in order to connect the terminal with the database by utilizing the new database connection if the database connection pool comprises no idle database connections.

In some embodiments, the reuse unit comprises: an attribute comparison unit for comparing a connection attribute between the terminal and the reused database connection with a connection attribute between the reused database connection and the database, to determine a difference thereof; and an attribute modification module for sending to the database an attribute modification request including the difference, the attribute modification request being used by the database to modify the connection attribute between the reused database connection and the database.

In some embodiments, the connection-establishing unit comprises: a sending module for sending a connection establishment request to the database; an addition module for adding a database connection within a connection establishing process into a preset array; a searching module for searching, from the preset array, a database connection corresponding to a response message returned by the database upon receiving the response message; and a connection module for connecting the terminal with the database by utilizing the database connection corresponding to the response message.

In some embodiments, the apparatus further comprises: a control unit for controlling the number of the database connection for the database according to a preset control rule of the database connection.

In some embodiments, the control unit comprises: a first control module for reusing the idle database connection and releasing a time-out database connection when the number of the received access requests is less than or equal to a first preset value; a second control module for reusing the idle database connection and releasing the idle database connection when the number of the received access requests is greater than the first preset value and less than or equal to a second preset value and the number of non-idle database connections for the database is greater than a preset maximum connection number of the database connection pool; and a third control module for establishing the new database connection, reusing the idle database connection, and releasing the idle database connection when the number of the received access requests is greater than the second preset value.

In some embodiments, the connection-establishing unit comprises: a selection module for selecting one of slave databases of the database as a target database if the database connection pool comprises no idle database connections; and a connection-establishing module for establishing a new database connection connected to the target database.

In some embodiments, the selection module is further used for determining a ratio of the number of non-idle database connections of a slave database to a weight of the slave database for each of the slave databases; and selecting a slave database with a minimum ratio as the target database.

In some embodiments, the selection module is further used for selecting one of the slave databases of the database as the target database by using a random algorithm.

In some embodiments, the apparatus further comprises: a fault detection unit for detecting whether a fault occurs in each of the slave databases; a shielding unit for shielding a faulted slave database; a probe unit for probing the faulted slave database at a preset interval; and a de-shielding unit for de-shielding a slave database when the fault is removed.

The method and apparatus for controlling the database connection according to the present application effectively utilize fewer database connections to support database access requests. This is implemented by determining whether there are idle database connections in a database connection pool after receiving an access request for a database sent from a terminal, reusing an idle connection if the database connection pool comprises an idle database connections, and sending a connection establishment request to the database to establish a database connection if the database connection pool comprises no idle database connections.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
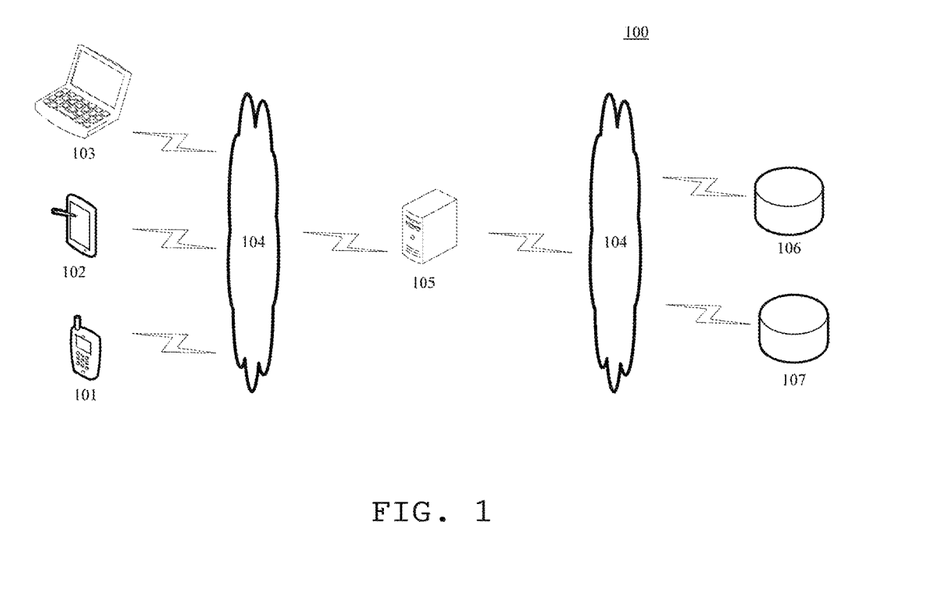
FIG. 1 is a diagram of an exemplary system framework to which the present application may be applied.

FIG. 1 shows an exemplary system framework 100 to which a method for controlling a database connection or an apparatus for controlling a database connection according to an embodiment of the present application can be applied.

As shown in FIG. 1, the system framework 100 may comprise terminal devices 101, 102, and 103, a network 104, a server 105 and databases 106 and 107. The network 104 serves as a medium for providing a communication link between the terminal devices 101, 102, and 103 and the server 105 and between the server 105 and the databases 106 and 107. The network 104 may comprise various connection types, for example, a wired communication link, a wireless communication link, and an optional fiber cable.

Application software installed on the terminal devices 101, 102, and 103 may interact with the server via the network 104. Similarly, the server 105 may interact with the first database 106 and the second database 107 via the network 104 to receive or transmit a message. Various applications requiring accessing the databases may be installed on the terminal devices 101, 102, and 103. Theses applications comprise, but not limited to, a web browser application, a shopping application, a search application, an instant messaging tool, a mailbox client, and social platform software.

The terminal devices 101, 102, and 103 may be various electronic devices having display screens, comprising but not limited to, smart phones, tablet computers, e-book readers, laptop portable computers, and desktop computers.

The server 105 may be a server for providing various services, for example, a database connection server to support the applications installed on the terminal devices 101, 102, and 103 to access the databases. The database connection server may comprise a database connection pool and maintain and manage database connections in the database connection pool. The database connection server may also perform analysis or other processings on the received database access request or the like; and. The database connection server may further send a request to the databases according to the received database access request and the number of the database connections. In addition, the database connection server may receive a message returned from the databases, and transmit a processing result (for example, a successful connection to the databases) corresponding to the database access request raised by the terminal devices to the terminal devices.

The databases 106 and 107 may be databases storing various types of data. For example, the databases 106 and 107 may store data required for the application installed on the terminal devices 101, 102, and 103. The terminal devices are allowed to access the databases after the databases are connected to the terminal devices 101, 102, and 103 via the database connections. The databases 106 and 107 may receive a request sent by the server 105, perform analysis or other processing on the request and return a processing result to the server.

It is to be noted that the method for controlling the database connection provided in the embodiment of the present application is generally executed by the server 105. Accordingly, the device for controlling the database connection is generally provided in the server 105.

It should be understood that the number of the terminal devices, the network, the servers and the databases in FIG. 1 is merely illustrative. According to actual demands, the number of the terminal devices, the network, the servers and the databases may be an arbitrary number.

Figure 2:
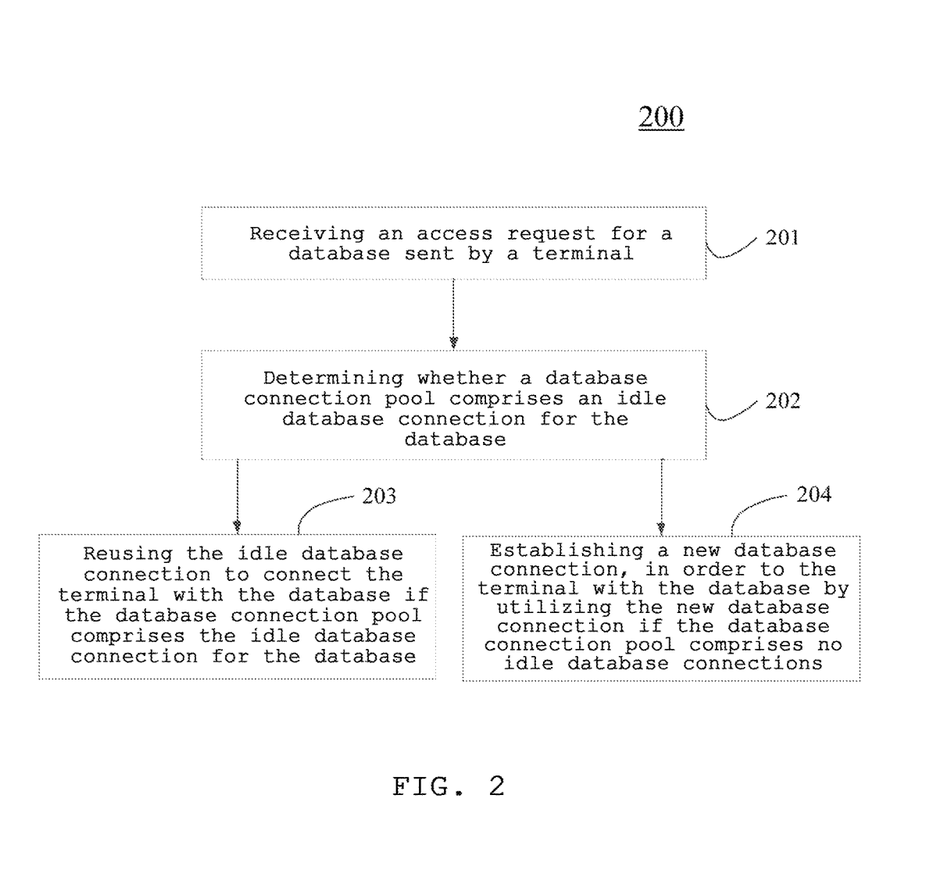
FIG. 2 is a flowchart of a method for controlling a database connection according to an embodiment of the present application.

Further referring to FIG. 2, a flowchart 200 of an application scenario of a method for controlling a database connection according to the present application is shown. The method for controlling the database connection according to this embodiment comprises the following steps.

At step 201, an access request for a database sent by a terminal is received.

In this embodiment, an electronic device (e.g., the server shown in FIG. 1) on which the method for controlling the database connection is operated may receive an access request for a database from terminals (e.g., the terminal devices shown in FIG. 1) installed with applications via a wired connection or a wireless connection. It should be understood that a path of a file to be accessed is contained in the access request for the database. It is to be noted that the wireless connection may comprise, but not limited to, 3G/4G connection, WiFi connection, Bluetooth connection, WiMAX connection, Zigbee connection, UWB (ultra wideband) connection, and other existing wireless connections or wireless connections to be developed in the future.

At step 202, a determination is made with regard to whether a database connection pool comprises an idle database connection for the database.

In this embodiment, based on the received access request for a database sent by the terminal, the electronic device (e.g., the server shown in FIG. 1) determines whether a database connection pool comprises an idle database connection for the database. Specifically, the database connection pool is a structure responsible for assigning, managing and releasing database connections, and allows the application installed on the terminal to repeatedly use an existing database connection rather than establishing a new one. When a database connection is not connected to a terminal device, this database connection may be referred to as an idle database connection.

At step 203, an idle database connection is reused to connect the terminal with the database if the database connection pool comprises an idle database connection for the database.

When the database connection pool comprises an idle database connection for the database, the idle database connection is reused. In this embodiment, after an application installed on the terminal finishes accessing or using the database via the database connection, the used database connection will be released. The reusing of a database connection may be interpreted as reusing a released database connection in order to connect the terminal with the database, so that the application installed on the terminal accesses or uses the database via the database connection.

At step 204, a new database connection is established and the terminal is connected to the database by utilizing the new database connection if the database connection pool comprises no idle database connections.

If the database connection pool comprises no idle database connections, a new database connection is required to be established for connecting the terminal with the database.

In some optional implementations of this embodiment, the step 204 may comprise the following substeps which are not shown in FIG. 2.

The steps comprises: selecting one of slave databases of the database as a target database if the database connection pool comprises no idle database connections; and establishing a new database connection connected to the target database.

if the database connection pool comprises no idle database connections, it is required to send a connection establishment request to the database. However, in practice, due to the vast throughout of the database, a client will perform access requests to a plurality of slave databases. In such a case, different slave databases may bear different load.

To ensure a load balance among the slave databases, it is required to select one of the slave databases of the database as a target database and establish a new database connection to the selected target database connection. In this way, the phenomenon where a certain slave database bears too much load while other slave databases bears too little load may be avoided.

In some optional implementations of this embodiment, the substep may further comprise the following steps which are not shown in FIG. 2.

The steps comprises: determining a ratio of the number of non-idle database connections of a slave database to a weight of the slave database for each of the slave databases; and selecting a slave database with a minimum ratio as the target database.

As the hardware and network connection conditions of different slave databases may be not exactly the same, different slave databases have different stabilities. The stability of each of the slave databases is embodied in a weight set for the slave database. It should be understood that, the number of non-idle database connections of different slave databases is also different. Specifically, the non-idle database connections refer to the database connections that are currently connecting the terminal and the slave databases.

The determination of the ratio of the number of non-idle database connections of each of the slave databases to the weight of the slave database may assist in the selection of a slave database with a better performance. For example, when two slave databases have an identical weight and the number of non-idle database connections of the first slave database is less than that of the second slave database, the first slave database is a better choice. Therefore, the slave database with the minimum ratio is selected as the target database.

It should be understood that the implementation of this embodiment is particularly suitable for the case where there is only one server in the system structure.

In some optional implementations of this embodiment, the substep may further comprise the following step which are not shown in FIG. 2.

One of the slave databases of the database is selected as a target database by using a random algorithm.

In this embodiment, the random algorithm may be an algorithm containing a random number generator therein. The implementation of this embodiment is particularly suitable for the case where there are a plurality of servers in the system structure. It should be understood that the implementation of this embodiment is particularly suitable for being used each time each of the servers in the system structure boots. As the profile of each of the servers is identical, and the starting slave database at the process where each of the servers loops through the slave databases is identical, the slave databases selected by the servers are likely to be a same one. Therefore, the load of a certain slave database is much higher than that of the other slave databases. The starting slave database is selected by using a random algorithm when a server boots. When a database access request from a terminal device is received subsequently, a target database may still be selected according to the number of non-idle databases of each of the slave databases and the weight of the slave database.

In this embodiment, by using a random algorithm, the server selects different starting slave databases. Therefore, the phenomenon where the load of a certain slave databases is much higher than that of the other slave databases is avoided, and the load balance of the slave databases is realized.

In some optional implementations of this embodiment, the method further comprises the following steps which are not shown in FIG. 2: detecting whether a fault occurs in each of the slave databases; shielding a faulted slave database; probing the faulted slave database at a preset interval; and de-shielding a slave database when the fault is removed.

When a certain slave database is faulted and cannot provide a normal service due to the network reason or other possible reasons, the server will shield the faulted slave database by a temporary isolation means. In practice, the temporary isolation means may be implemented by setting a list of databases that work normally. When it is detected that a certain database is not faulted, the slave databases ever faulted will be removed from the list. Therefore, the connection establishment request will not be sent to the faulted slave databases.

In this embodiment, the faulted slave database is probed periodically to determine whether the faulted slave database returns to normal and can provide a normal service. When the fault is removed, the slave database is de-shielded. In practice, when the slave database returns to normal, the slave database may be added back into the list of databases that work normally.

The method for controlling the database connection provided in the embodiment of the present application effectively utilize fewer database connections to support database access requests. This is implemented by determining whether there are idle database connections in a database connection pool after receiving an access request for a database sent from a terminal, reusing an idle connection if the database connection pool comprises an idle database connections, and sending a connection establishment request to the database to establish a database connection if the database connection pool comprises no idle database connections.

Figure 3:
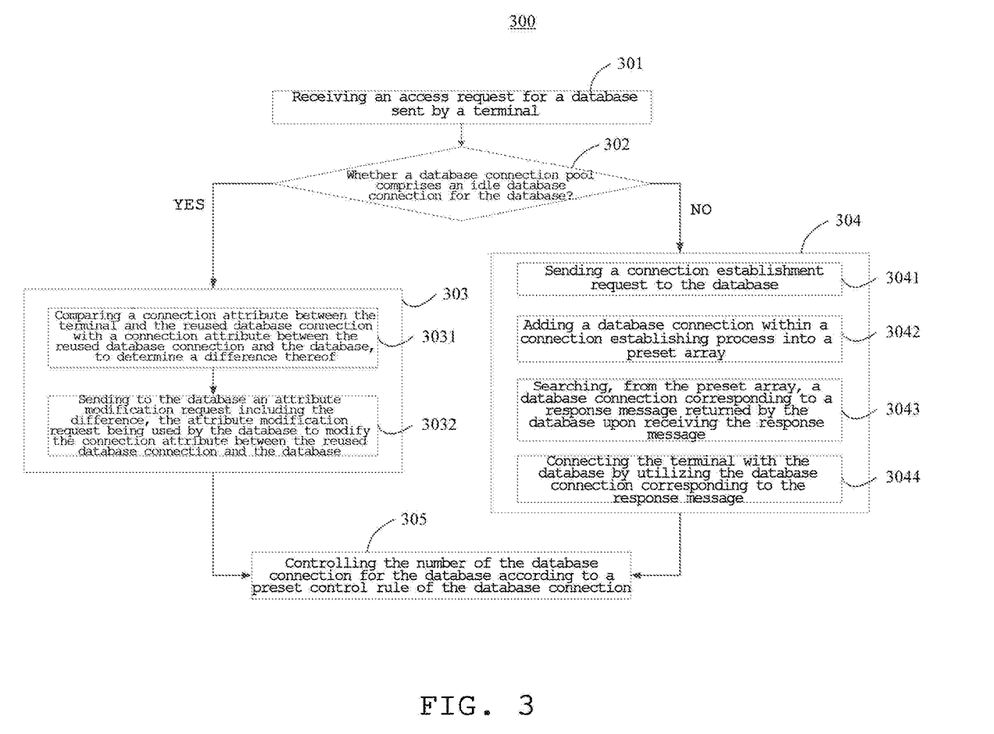
FIG. 3 is a flowchart of a method for controlling a database connection according to another embodiment of the present application.

Further referring to FIG. 3, a flowchart 300 of a method for controlling a database connection according to another embodiment of the present application is shown. The method for controlling the database connection provided in this embodiment comprises the following steps.

At step 301, an access request for a database sent by a terminal is received.

In this embodiment, the terminal may be the terminal devices 101, 102, and 103 shown in FIG. 1, and the database may be the database 106 and 107 shown in FIG. 1. When an application installed on a terminal needs to access a database, an access request for the database is sent to a server by the terminal.

At step 302, a determination is made with regard to whether a database connection pool comprises an idle database connection for the database.

To fully and efficiently utilize existing database connections, it is required to determine whether a database connection pool comprises an idle database connection for the database. An idle database connection is reused, i.e., step 303 is executed, if the database connection pool comprises an idle database connection for the database. A new database connection is established, i.e., step 304 is executed, if the database connection pool comprises no idle database connections.

At step 303, an idle database connection is reused to connect the terminal with the database if the database connection pool comprises an idle database connection for the database.

Specifically, the step 303 comprises substeps 3031 and 3032.

Substep 3031 refers to comparing a connection attribute between the terminal and the reused database connection with a connection attribute between the reused database connection and the database, to determine a difference thereof.

Substep 3032 refers to sending to the database an attribute modification request including the difference, the attribute modification request being used by the database to modify the connection attribute between the reused database connection and the database.

As applications installed on different terminals have different attributes, connection attributes between different terminals and database connections are different. Similarly, the connection attributes between different database connections and databases are also different. However, when a terminal is connected with the database through a database connection, it is required that the connection attribute between the terminal and the database connection and the connection attribute between a different database connection and the database are consistent. Otherwise, the connection between the terminal and the database connection and the connection between the different database connection and the database need to be bundled. Such binding will lead to very low reuse rate of database connections.

In this embodiment, the connection attribute between the terminal and the database connection is compared with a connection attribute between a different database connection and the database to obtain a difference. Then the difference is packaged into an attribute modification request and sent to the database. The database will modify the connection attribute between the database connection and the database upon receiving the attribute modification request. In this way, the connection attribute between the terminal and the database connection and the connection attribute between the different database connection and the database are consistent.

By comparing the difference between the connection attributes and modifying the difference of the connection attribute between the database connection and the database, the reuse rate of the database connection can be improved effectively, and the maintenance cost of the database connection can be reduced.

At step 304, a new database connection is established and the terminal is connected to the database by utilizing the new database connection if the database connection pool comprises no idle database connections.

Specifically, the step 304 comprises the following substeps.

Substep 3041 refers to sending a connection establishment request to the database.

To establish a new database connection, a connection establishment request is sent to the database first, so that the database establishes a new database connection upon receiving the connection establishment request.

Substep 3042 refers to adding a database connection within a connection establishing process into a preset array.

In this embodiment, the database connection within the connection establishing process may be interpreted as a database connection which is not currently connected to the database while a connection establishment request has already been sent to the database. In practice, the preset array may be a particular hash bucket. The hash bucket is a virtual subgroup of elements in a hash table. In this way, the search and acquisition operations in majority sets are easier and quicker.

Substep 3043 refers to searching, from the preset array, a database connection corresponding to a response message returned by the database upon receiving the response message.

In this embodiment, after the database connection within the connection establishing process is added into the preset array, a database connection corresponding to the response message is processed when the response message returned by the database is received. Thus, the server may process other service logics in parallel and will not fails to perform other operations because of waiting for the response from the database, i.e., the server may establish a new database connection in an asynchronous manner.

Substep 3044 refers to connecting the terminal with the database by utilizing the database connection corresponding to the response message.

It should be understood that the response message is a message about the successful establishment of a database connection. After the database connection is successfully established, the terminal and the database are connected.

As the existing method for establishing a database connection employs a synchronous mode, normally, the server will be blocked and wait for one RTT (Round-Trip Time) after sending a connection establishment request to the database. If an abnormal network state occurs or if the database to be accessed reaches a performance limitation, the server will be blocked and wait for one time-out period (a level of 10 ms). The blocking and waiting time of a client possibly reach the level of 100 ms by taking into account the duration consumed by reconnection due to the failure, which will greatly influence the throughput of the server.

In this embodiment, a new database connection is established in an asynchronous manner, so that the server may synchronously processes other service operations, and the effect of improving the throughput of the server is realized.

At step 305, the number of the database connection for the database is controlled according to a preset control rule of the database connection.

The access or usage by an application installed in a terminal to a database is subjected to a peak period and a trough period. At the peak period, a large amount of databases are required to support the access or usage. However, at the trough period, as few database connections as possible may be used to support the access or usage. Therefore, by controlling the number of database connections of the database, the maintenance cost of database connections can be effectively reduced, and the existing database connections are fully used.

In some optional implementations of this embodiment, the step 305 specifically comprises the following substeps which are not shown in FIG. 3.

Substep 1 refers to reusing an idle database connection and releasing a time-out database connection when the number of the received access requests is less than or equal to a first preset value.

In this embodiment, the first preset value is a value set according to the database connections in the database connection pool. When the number of the received access requests is less than or equal to the first preset value, it may be appreciated to be the trough period, and the number of database connections is controlled by reusing an idle database connection and releasing a time-out database connection.

Specifically, the releasing of a time-out database connection may be interpreted as releasing the following database connection. This database connection is in an idle state out the database connection pool, and lasts for a duration exceeding a preset duration value. In order to reduce the maintenance cost of database connections, this database connection is released.

Substep 2 refers to reusing an idle database connection and releasing an idle database connection when the number of the received access request is greater than the first preset value and less than or equal to a second preset value and the number of non-idle database connections for the database is greater than a preset maximum connection number of the database connection pool.

In this embodiment, the maximum connection number of the database connection pool is a value set according to the hardware and the network condition of the database.

When the number of the received access requests is greater than the first preset value and less than or equal to the second preset value, it may be appreciated that the current database access number is between the peak period and the trough period, and the number of database connections is controlled by reusing idle database connections.

When the number of the received access requests is greater than the first preset value and less than or equal to the second preset value and the number of non-idle database connections for the database is greater than the preset maximum connection number of the database connection pool, it may be appreciated that the current database access number is at a fallback period after the peak period, and the number of database connections is controlled by reusing idle database connections and releasing idle database connections. Specifically, the releasing of an idle database refers to timely releasing database connections exceeding the maximum connection number of the database connection pool, thereby avoiding the reduction of the throughput of the server due to the maintenance of the established database connections.

Substep 3 refers to establishing a new database connection, reusing an idle database connection, and releasing an idle database connection when the number of the received access request is greater than the second preset value.

In this embodiment, when the number of the received access requests is greater than the second preset value, it may be appreciated that the current database access number is at the peak period. Accordingly, the number of database connections is controlled by establishing a new database connection, reusing an idle database connection, and releasing an idle database connection. As at the peak period, it is required to establish a new database connection to meet the demands for the access requests. Meanwhile, idle database connections need to be released timely, so that the ability of the database to process other services is prevented from reducing due to the maintenance of idle database connections. By using the approach in this embodiment, the number of database connections may be dynamically maintained at a higher level.

Figure 4:
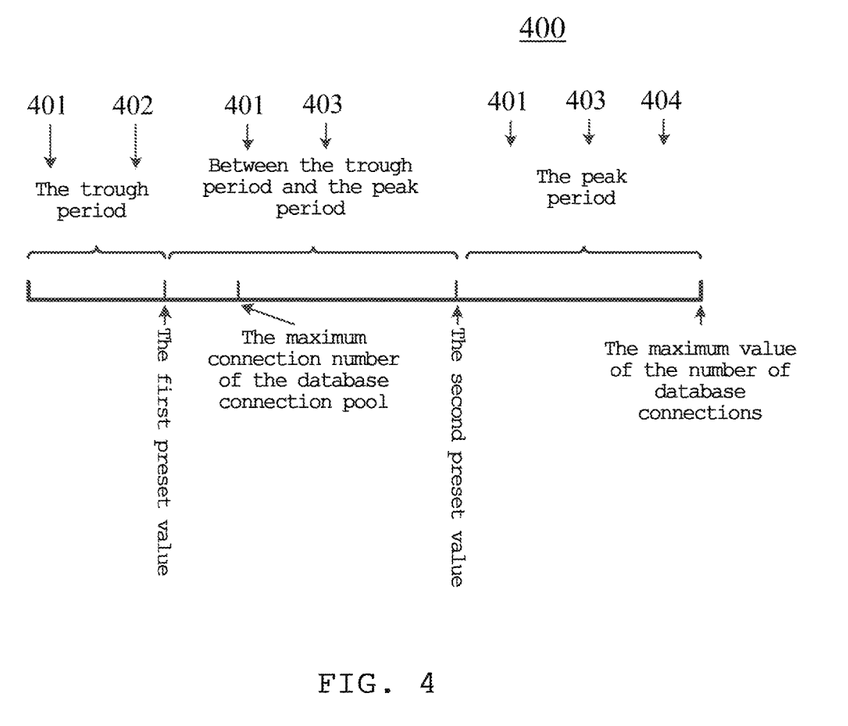
FIG. 4 is a working diagram of a control rule of the database connection according to the method for controlling the database connection of the present application.

FIG. 4 shows a specific working diagram 400 of the preset database connection control rule in the above implementations of this embodiment. Specifically, 401 denotes reusing an idle database connection, 402 denotes releasing a time-out database connection, 403 denotes releasing an idle database connection and 404 denotes establishing a new database connection.

In this embodiment, the first preset value may be less than the maximum connection number of the database connection pool, and the second preset value may be greater than the maximum connection number of the database connection pool and less than the maximum value of the number of database connections. Specifically, the maximum value of the number of database connections is determined by the hardware and network condition of the database, and represents the maximum value of the number of database connections which can be supported by the database. When the number of the access requests for the database is less than the first preset value, it is regarded as the trough period. When the number of access requests for the database is greater than or equal to the first preset value and less than the second preset value, it is regarded as a transition period between the trough period and the peak period. When the number of access requests for the database is greater than or equal to the second preset value, it is regarded as the peak period.

At the trough period, the number of database connections is controlled via 401 and 402. At the transition period, the number of database connections is controlled via 401 and 403. At the peak period, the number of database connections is controlled via 401, 403, and 404.

According to the method for controlling a database connection provided in the embodiment of the present application, by comparing a connection attribute between a database connection and the terminal with a connection attribute between the database connection and the database, and sending to the database an attribute modification request including the difference, the database modifies the connection attributes between the database connection and the database, which effectively improved the reuse rate of the database connection. By establishing a database connection in an asynchronous manner, the phenomenon where the server is blocked during establishing a database connection is avoided effectively, and the throughput of the database is improved. Moreover, by effectively controlling the number of database connections, the cost of the database for maintaining database connections is effectively reduced, the stability is improved, and an efficient support to a vast access requests from a terminal is realized.

Figure 5:
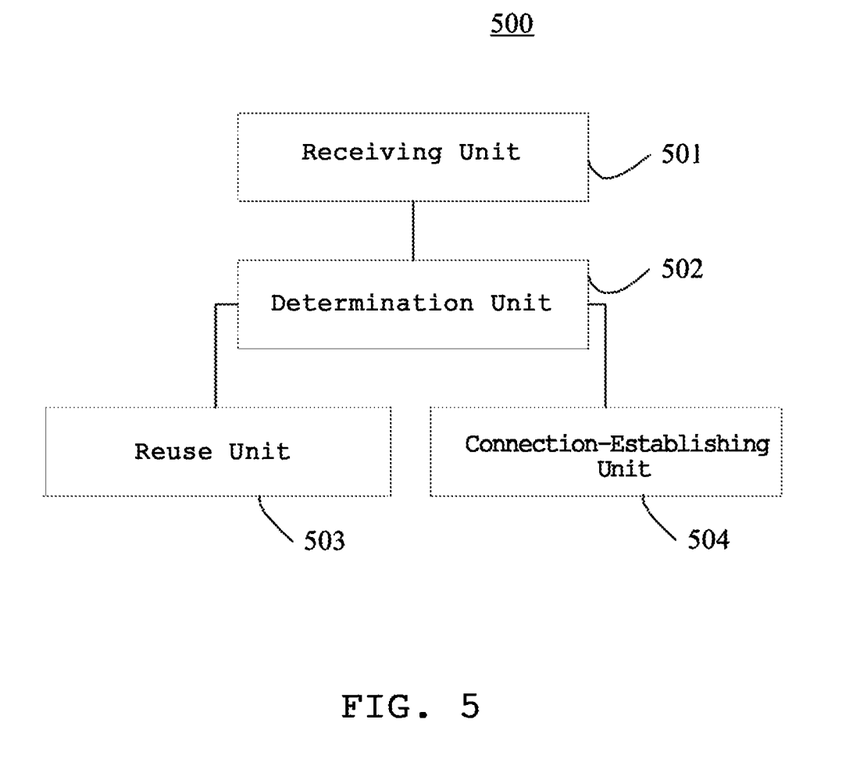
FIG. 5 is a structural diagram of an apparatus for controlling a database connection according to an embodiment of the present application.

Further referring to FIG. 5, a structural diagram 500 of an apparatus for controlling a database connection according to the present application is shown. The apparatus for controlling the database connection according to the present embodiment comprises: a receiving unit 501, a determination unit 502, a reuse unit 503 and a connection-establishing unit 504.

Specifically, the receiving unit 501 is used for receiving an access request for a database sent by a terminal. The determination unit 502 is used for determining whether a database connection pool comprises an idle database connection for the database. The reuse unit 503 is used for reusing the idle database connection to connect the terminal with the database if the database connection pool comprises the idle database connection for the database. The connection-establishing unit 504 is used for establishing a new database connection, in order to connect the terminal with the database by utilizing the new database connection if the database connection pool comprises no idle database connections.

In this embodiment, the receiving unit 501 is used for receiving an access request for a database sent by a terminal. The determination unit 502 determines whether a database connection pool comprises an idle database connection for the database. If the database connection pool comprises the idle database connection for the database, the reuse unit 503 is called to reuse the idle database connection. If the database connection pool comprises no idle database connections, the connection-establishing unit 504 is called to establish a new database connection.

In an optional implementation of this embodiment, the reuse unit 503 comprises an attribute comparison module and an attribute modification module, which are not shown in FIG. 5.

Specifically, the attribute comparison unit is used for comparing a connection attribute between the terminal and the reused database connection with a connection attribute between the reused database connection and the database, to determine a difference thereof. The attribute modification module is used for sending to the database an attribute modification request including the difference, the attribute modification request being used by the database to modify the connection attribute between the reused database connection and the database.

In this embodiment, the attribute comparison unit is used for comparing a connection attribute between the terminal and the reused database connection with a connection attribute between the reused database connection and the database to determine a difference thereof and sending to the attribute modification module the difference. The attribute modification module packages the difference into the attribute modification request and then sends the attribute modification request to the database. The database modifies the connection attribute between the reused database connection and the database according to the difference. Thus, the connection between the terminal and the database is quickly realized.

In an optional implementation of this embodiment, the connection-establishing unit 504 comprises the following modules which are not shown in FIG. 5: a sending module, an addition module, a searching module and a connection module.

Specifically, the sending module is used for sending a connection establishment request to the database. The addition module is used for adding a database connection within a connection establishing process into a preset array. The searching module is used for searching, from the preset array, a database connection corresponding to a response message returned by the database upon receiving the response message. The connection module is used for connecting the terminal with the database by utilizing the database connection corresponding to the response message.

In this embodiment, during the establishing of a new database connection, a connection establishment request is sent to the database by the sending module. Then, the addition module adds a database connection within a connection establishing process into a preset array. The searching module searches, from the preset array, a database connection corresponding to a response message returned by the database upon receiving the response message. The connection module connects the terminal with the database by using the database connection. By means of the asynchronous connection establishment, the server is prevented from being blocked resulted from the conventional synchronous connection establishment.

In some optional implementations of this embodiment, the apparatus further comprises a control unit which is not shown in FIG. 5. The control unit is used for controlling the number of the database connection for the database according to a preset control rule of the database connection.

By regularly controlling the number of the database connections for the database, the cost of the database for maintaining the database connections may be effectively reduced.

In some optional implementations of this embodiment, the control unit further comprises the following control modules: a first control module, a second control module, and a third control module.

Specifically, the first control module is used for reusing the idle database connection and releasing a time-out database connection when the number of the received access requests is less than or equal to a first preset value. The second control module is used for reusing the idle database connection and releasing the idle database connection when the number of the received access request is greater than the first preset value and less than or equal to a second preset value and the number of non-idle database connections for the database is greater than a preset maximum connection number of the database connection pool. The third control module is used for establishing the new database connection, reusing the idle database connection, and releasing the idle database connection when the number of the received access request is greater than the second preset value.

According to the number of the received access requests for the database, there are a trough period, a peak period and a transition period between the trough period and the peak period. By managing the number of database connections with different database connection management approaches at the three periods, the cost of the database for maintaining the database connections is effectively controlled, and the operation stability of the database is improved.

In some optional implementations of this embodiment, the reuse unit 504 further comprises a selection module and a connection-establishing module, which are not shown in FIG. 5.

Specifically, the selection module is used for selecting one of slave databases of the database as a target database if the database connection pool comprises no idle database connections. The connection-establishing module is used for establishing a new database connection connected to the target database.

However, in practice, in view of the high throughput of the database, a client will interact with a plurality of slave databases. Therefore, the selection module selects one of the plurality of slave databases as a target databases, and the connection-establishing module establishes a database connection to the target database.

In some optional implementations of this embodiment, the selection module is further used for: determining a ratio of the number of non-idle database connections of a slave database to a weight of the slave database for each of the slave databases; and selecting a slave database with a minimum ratio as the target database.

The selection module may determine the target database according to the number of non-idle database connections for each of the slave databases and the weight of this slave database. In this embodiment, the selection module may select a slave database having a minimum ratio of the number of non-idle database connections to the weight of the serve as the target database.

In some optional implementations of this embodiment, the selection module is further used for selecting one of the slave databases of the database as the target database by using a random algorithm.

In this embodiment, the random algorithm may be an algorithm containing a random number generator therein. The implementation of this embodiment is particularly suitable for the case where there are a plurality of servers in the system structure.

In some optional implementations of this embodiment, the apparatus further comprises the following portions which are not shown in FIG. 5: a fault detection unit, a shielding unit, a probe unit and a de-shielding unit.

The fault detection unit is used for detecting whether a fault occurs in each of the slave databases. The shielding unit is used for shielding a faulted slave database. The probe unit is used for probing the faulted slave database at a preset interval. The de-shielding unit is used for de-shielding a slave database when the fault is removed.

In this embodiment, the fault detection unit may detect a faulted database in real time and calls the shielding unit to shield the faulted database. When the probe unit probes that the faulted databases returns to normal, the fault detection unit calls the de-shielding unit to de-shield the faulted database.

According to the apparatus for controlling a database connection provided in the embodiment of the present application, a vast database access requests can be satisfied by efficiently utilizing database connections.

Hereinafter, reference is made to FIG. 6, which illustrates a schematic structural diagram of a computer system 600 adapted to implement the server of the embodiments of the present application.

Figure 6:
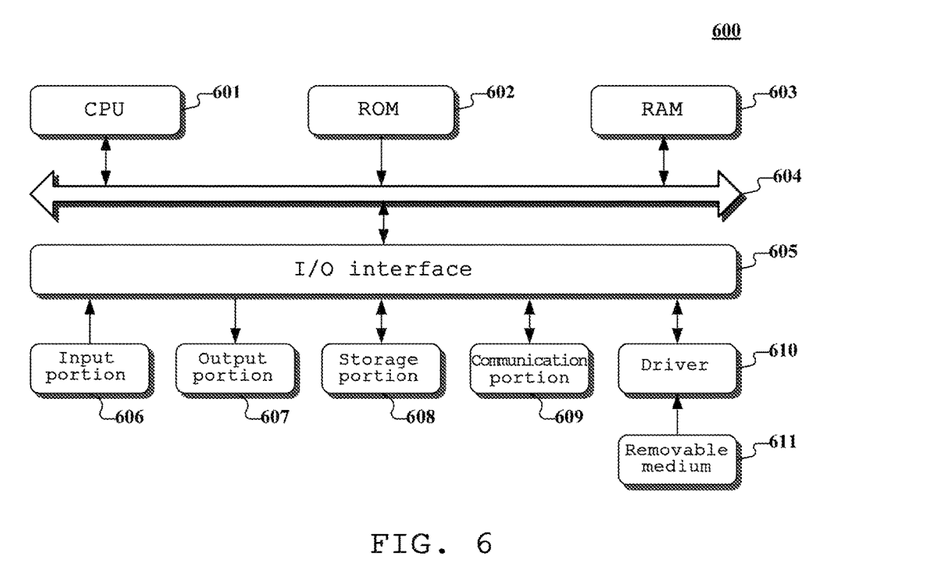
FIG. 6 is a schematic structural diagram of a computer system adapted to implement the server of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method of the flow chart. In such an embodiment, the computer program may be downloaded and installed from a network via the communication portion 609, and/or may be installed from the removable media 611. When the computer program is executed by the CPU 601, the above function defined by the method of the present application is implemented.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units according to the embodiments of the present application may be implemented by software or hardware. The described units may be disposed in the processors. For example, a following description may be made. A processor comprises an receiving unit, a determination unit, a reuse unit, and a connection-establishing unit. The names of these units are not intended to limit the corresponding units. For example, the receiving unit may also be referred to as a unit for receiving an access request for a database sent by a terminal.

In another aspect, the present application further provides a nonvolatile computer storage medium. The nonvolatile computer storage medium may be the nonvolatile computer storage medium included in the apparatus in the above embodiments, or a stand-alone nonvolatile computer storage medium which has not been assembled into the apparatus. The nonvolatile computer storage medium stores one or more programs. When the one or more programs are executed by an apparatus, the apparatus is caused to perform: receiving an access request for a database sent by a terminal; determining whether a database connection pool comprises an idle database connection for the database; reusing the idle database connection to connect the terminal with the database if the database connection pool comprises the idle database connection for the database; and establishing a new database connection, in order to connect the terminal with the database by utilizing the new database connection if the database connection pool comprises no idle database connections.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method executed by a database connection server for controlling a database connection, the method comprising:
   receiving an access request for a database sent by a terminal;
   determining whether a database connection pool comprises an idle database connection for the database;
   reusing the idle database connection to connect the terminal with the database if the database connection pool comprises the idle database connection for the database;
   establishing a new database connection, in order to connect the terminal with the database by utilizing the new database connection if the database connection pool comprises no idle database connections,
   wherein the reusing the idle database connection to connect the terminal with the database if the database connection pool comprises the idle database connection for the database comprises:
   comparing a connection attribute between the terminal and the reused database connection with a connection attribute between the reused database connection and the database, to determine a difference thereof; and
   sending to the database an attribute modification request including the difference, the attribute modification request being used by the database to modify the connection attribute between the reused database connection and the database.

2. The method according to claim 1, the establishing the new database connection, in order to connect the terminal with the database by utilizing the new database connection if the database connection pool comprises no idle database connections comprising:
  sending a connection establishment request to the database;
  adding a database connection within a connection establishing process into a preset array;
  searching, from the preset array, a database connection corresponding to a response message returned by the database upon receiving the response message; and
  connecting the terminal with the database by utilizing the database connection corresponding to the response message.

3. The method according to claim 1, the method further comprising:
  controlling a number of the database connection for the database according to a preset control rule of the database connection.

4. The method according to claim 3, the controlling the number of the database connection for the database according to the preset control rule of the database connection comprising:
  reusing the idle database connection and releasing a time-out database connection when a number of the received access requests is less than or equal to a first preset value;
  reusing the idle database connection and releasing the idle database connection when
  the number of the received access request is greater than the first preset value and less than or equal to a second preset value, and
  a number of non-idle database connections for the database is greater than a preset maximum connection number of the database connection pool; and
  establishing the new database connection, reusing the idle database connection, and releasing the idle database connection when the number of the received access request is greater than the second preset value.

5. The method according to claim 1, the establishing the new database connection, in order to connect the terminal with the database by utilizing the new database connection if the database connection pool comprises no idle database connections comprising:
  selecting one of slave databases of the database as a target database if the database connection pool comprises no idle database connections; and
  establishing a new database connection connected to the target database.

6. The method according to claim 5, the selecting one of the slave databases of the database as the target database comprising:
  determining a ratio of a number of non-idle database connections of a slave database to a weight of the slave database for each of the slave databases; and
  selecting a slave database with a minimum ratio as the target database.

7. The method according to claim 5, the selecting one of the slave databases of the database as the target database comprising:
  selecting one of the slave databases of the database as the target database by using a random algorithm.

8. The method according to claim 5, method further comprising:
  detecting whether a fault occurs in each of the slave databases;
  shielding a faulted slave database;
  probing the faulted slave database at a preset interval; and
  de-shielding a slave database when the fault is removed.

9. An apparatus for controlling a database connection, the apparatus comprising:
  at least one processor; and
  a memory storing instructions, which when executed by the at least one processor, cause the at least one processor to perform operations, the operations comprising:
  receiving an access request for a database sent by a terminal;
  determining whether a database connection pool comprises an idle database connection for the database;
  reusing the idle database connection to connect the terminal with the database if the database connection pool comprises the idle database connection for the database;
  establishing a new database connection, in order to connect the terminal with the database by utilizing the new database connection if the database connection pool comprises no idle database connections,
  wherein the reusing the idle database connection to connect the terminal with the database if the database connection pool comprises the idle database connection for the database comprises:
  comparing a connection attribute between the terminal and the reused database connection with a connection attribute between the reused database connection and the database, to determine a difference thereof; and
  sending to the database an attribute modification request including the difference, the attribute modification request being used by the database to modify the connection attribute between the reused database connection and the database.

10. The apparatus according to claim 9, wherein the establishing the new database connection, in order to connect the terminal with the database by utilizing the new database connection if the database connection pool comprises no idle database connections comprises:
  sending a connection establishment request to the database;
  adding a database connection within a connection establishing process into a preset array;
  searching, from the preset array, a database connection corresponding to a response message returned by the database upon receiving the response message; and
  connecting the terminal with the database by utilizing the database connection corresponding to the response message.

11. The apparatus according to claim 9, wherein the operations further comprise:
  controlling a number of the database connection for the database according to a preset control rule of the database connection.

12. The apparatus according to claim 11, wherein the controlling the number of the database connection for the database according to the preset control rule of the database connection comprises:
  reusing the idle database connection and releasing a time-out database connection when a number of the received access requests is less than or equal to a first preset value;
  reusing the idle database connection and releasing the idle database connection when
  the number of the received access request is greater than the first preset value and less than or equal to a second preset value, and a number of non-idle database connections for the database is greater than a preset maximum connection number of the database connection pool; and establishing the new database connection, reusing the idle database connection, and releasing the idle database connection when the number of the received access request is greater than the second preset value.

13. The apparatus according to claim 9, wherein the establishing the new database connection, in order to connect the terminal with the database by utilizing the new database connection if the database connection pool comprises no idle database connections comprises:

selecting one of slave databases of the database as a target database if the database connection pool comprises no idle database connections; and establishing a new database connection connected to the target database.

14. The apparatus according to claim 13, wherein the selecting one of the slave databases of the database as the target database comprises:

determining a ratio of a number of non-idle database connections of a slave database to a weight of the slave database for each of the slave databases; and selecting a slave database with a minimum ratio as the target database.

15. The apparatus according to claim 13, wherein the selecting one of the slave databases of the database as the target database comprises:

selecting one of the slave databases of the database as the target database by using a random algorithm.

16. The apparatus according to claim 9, wherein the operations further comprise:

detecting whether a fault occurs in each of the slave databases;

shielding a faulted slave database;

probing the faulted slave database at a preset interval; and de-shielding a slave database when the fault is removed.

17. A non-transitory storage medium storing one or more programs, the one or more programs when executed by an apparatus, causing the apparatus to perform a method for controlling a database connection, comprising:

receiving an access request for a database sent by a terminal;

determining whether a database connection pool comprises an idle database connection for the database;

reusing the idle database connection to connect the terminal with the database if the database connection pool comprises the idle database connection for the database; and establishing a new database connection, in order to connect the terminal with the database by utilizing the new database connection if the database connection pool comprises no idle database connections, wherein the reusing the idle database connection to connect the terminal with the database if the database connection pool comprises the idle database connection for the database comprises:

comparing a connection attribute between the terminal and the reused database connection with a connection attribute between the reused database connection and the database, to determine a difference thereof; and sending to the database an attribute modification request including the difference, the attribute modification request being used by the database to modify the connection attribute between the reused database connection and the database.

\* \* \* \* \*